Jan. 20, 1970     C. R. SNYDER     3,490,736

GLASS VALVE

Filed June 15, 1967     2 Sheets-Sheet 1

INVENTOR.
CARL R. SNYDER
BY
ATTORNEY

United States Patent Office 3,490,736
Patented Jan. 20, 1970

3,490,736
GLASS VALVE
Carl R. Snyder, Chalfont, Pa., assignor to Fischer & Porter Co., Warminster, Pa., a corporation of Pennsylvania
Filed June 15, 1967, Ser. No. 646,285
Int. Cl. F16k 31/50, 11/20, 27/06
U.S. Cl. 251—215                                    6 Claims

ABSTRACT OF THE DISCLOSURE

A valve structure having a glass body formed by a cylindrical outer section and a re-entrant inner section coaxially disposed therein, inlet and outlet pipes extending at diametrically opposed positions from the outer section, the inlet pipe communicating with the inner section and the outlet pipe with the outer section, whereby incoming fluid enters the inner section and flows into the outer section through a seat formed at the open end of the inner section. The seat is engaged by a plug movable axially in the inner section and coupled to one end of a stem having a threaded portion which engages internal threading on the inner section to advance or retract the plug as the stem is turned by a handle attached to the other end of the stem, the plug being formed of an inert material and having an integral seal which engages the wall of the inner section.

---

This invention relates generally to valves for controlling fluid flow, and more particularly to a transparent valve structure in which all of the wetted parts are of non-reactive material.

In a valve structure, the function of the valve body is to regulate the flow of fluid passing therethrough with a predetermined pattern as the valve stem is moved by the operator to vary the net orifice or flow area. In order to fulfill this function properly, the valve body must contain the fluid without leaking and it must have adequate capacity or flow area. Also the valve body must resist erosion and corrosion from the fluid contained therein, and it must be fitted with a movable plug that can be positioned accurately with respect to the valve seat in accordance with the dictates of the operator.

Many valves of conventional design make use of moving parts which require greasing or lubrication to maintain them in working order. When a valve is intended for laboratory use, for a distilled water system or for other processes in which purity is important, grease or lubricating oils are objectionable for they tend to contaminate the fluid being controlled. And when the fluid is a highly corrosive acid, such as hydrochloric acid, the wetted parts of standard valves, even those making use of a glass body, are not suitable, for the moving parts are subject to attack by the fluid.

Accordingly, it is the main object of this invention to provide a valve structure having a glass body and moving parts which are chemically inert and not subject to attack by acids and other highly corrosive fluids.

A significant feature of the invention is that the glass body is of high visibility so that the fluid flow may be continuously observed and the presence of foreign matter detected.

More specifically, it is an object of the invention to provide a rugged glass valve having low installation and maintenance costs, the valve affording positive shut-off and throttling.

Still another object of the invention is to provide a glass valve in which deposits of foreign matter and sediment are visible, and which includes a drain plug to facilitate removal thereof.

Briefly stated, these objects are attained in a valve structure having a glass body formed by a cylindrical outer section and a tubular re-entrant section coaxially disposed therein, inlet and outlet pipes projecting from the outer sections at diametrically opposed positions thereon, the inlet pipe communicating with the inner section, the outlet pipe communicating with the outer section, whereby fluid entering the inlet pipe passes into the inner section and flows through a valve seat formed at the free end thereof into the outer section for discharge through the outlet pipe, a plug being movable axially in the inner section to engage said seal and thereby reduce or close the valve orifice, the plug being coupled to a stem which terminates in a handle and which has a threaded section engaging internal threading on the wall of said inner section, the plug being formed of Teflon and including an integral seal.

For a better understanding of the invention, as well as other objects and further features thereof, reference is made to the following detailed description to be read in conjunction with the accompanying drawing wherein like components in the several views are represented by like reference numerals.

Figure 1:
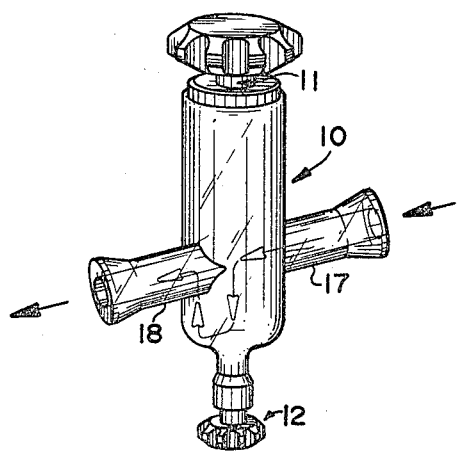
FIG. 1 is a perspective view of a glass valve structure in accordance with the invention, the flow of fluid therethrough being indicated by arrows.

Referring now to the drawings, the valve structure in accordance with the invention has three main components; namely, a valve body generally designated by numeral 10, moving parts including a plug and stem, generally designated by numeral 11, and a drain plug 12.

Figure 2:
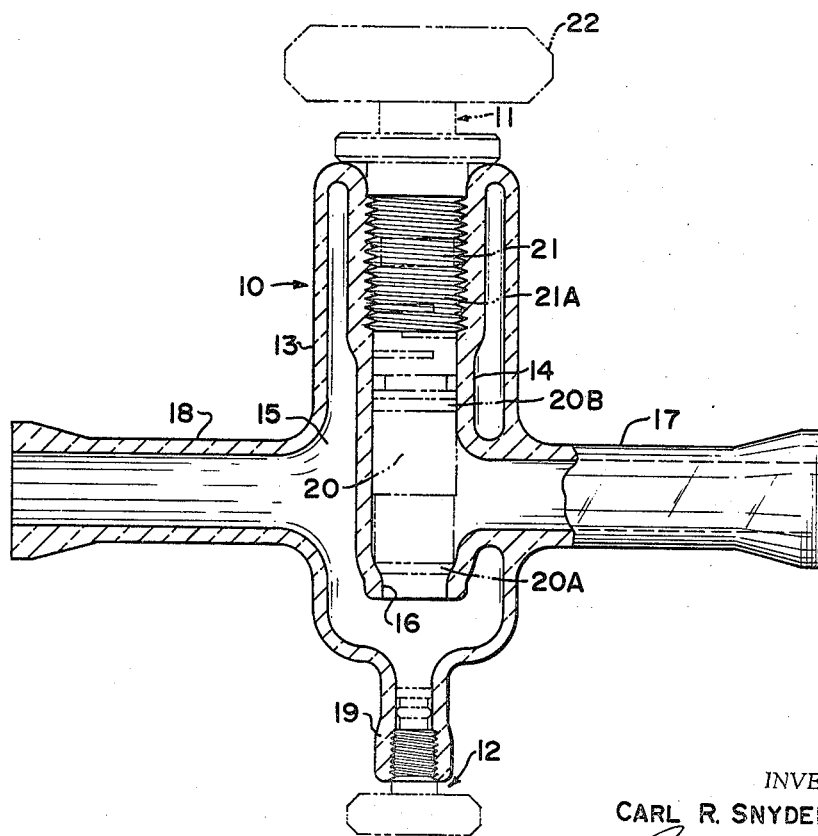
FIG. 2 is a longitudinal section taken through the valve structure.
Figure 3:
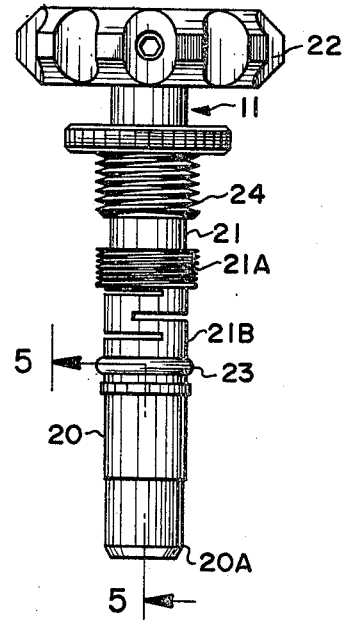
FIG. 3 is an elevational view of the moving parts of the valve structure.

Valve body 10, as best seen in FIG. 2, is of a transparent, high strength material and is preferably formed of borosilicate glass, such as Corning 7740 or Kimble KG33. The glass body is constituted by a cylindrical outer section 13 provided with a re-entrant tubular section 14, which inner section is disposed coaxially within the outer section to define an annular fluid chamber 15. The free end of the inner section is shaped to define a valve seat 16.

Extending from the outer section at diametrically opposed positions thereon are an inlet pipe 17 and an outlet pipe 18, the two pipes having conical ends and being in axial alignment whereby the valve may readily be installed in a fluid line. The passage of the fluid through the valve is indicated by the arrows in FIG. 1. The lower end of outer section 13 is provided with an extension 19 of restricted diameter which is adapted to receive the drain plug 12.

The moving parts 11 of the valve are constituted by a valve plug 20 which is coupled to one end of a stem 21, the other end of the stem being attached to a handle 22 of the same material as the plug. Plug 20 is of generally cylindrical shape and is formed of tetrafluoroethylene (Teflon) or a plastic material having equivalent chemical and mechanical properties. This plastic material is chemically inert and will not react with acids or other highly corrosive fluids. The plug material, while possessing a substantial degree of stiffness has some softness or flexibility and will therefore conform to surfaces against which it may be pressed. Because of this characteristic and by reason of its low coefficient of friction, Teflon is admirably suited for use as a valve plug without the use of any lubricant or sealing agent under conditions where binding or sticking would be likely to occur when the valve remains exposed to chemicals through extended periods of non-use.

The lower end 20A of plug 20 has a conical formation to conform to the profile of valve seat 16, as shown in the closed valve position illustrated in FIG. 2. The diameter of the plug is slightly less than the inner diameter of the inner section 14 with the exception of a small annular portion 20B which is integral with the plug and forms a sealing ring whose diameter is slightly greater than the inner diameter of section 14. Thus as plug 20 moves within the inner section, the sealing ring 20B is compressed against the wall thereof to prevent leakage.

Stem 21 is formed of Penton (chlorinated polyether—Hercules Powder Co.), or Kel-F (trifluorochloroethylene—Minnesota Mining Mfg. Co.) or any equivalent high strength plastic having a high resistance to chemicals as well as to temperature changes. The stem is strong and rigid and has a threaded section 21A which engages internal threading formed on the wall of the glass inner section 14. This internal threading, as well as that on glass extension 19, is formed in the course of making the glass valve body by shrinking the glass in the molten condition, on a threaded mandrel.

Just below section 21A on stem 21 is a slotted section 21B having three spaced slits which are normal to the longitudinal axis of the stem and are on alternate sides thereof to impart spring-like characteristics to this section. Since the stem is of rigid material, when it acts to close the valve by forcing the plug against the valve seat, it imposes a hard force against the glass seal which may produce internal stresses in the glass body. But because of the spring-like characteristics of the slotted section 21B, this force is cushioned, thereby minimizing disturbing stresses and yet maintaining the valve tightly closed.

Figure 5:
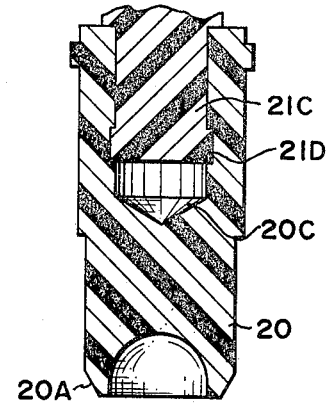
FIG. 5 is a section taken in the plane indicated by line 5—5 in FIG. 3 and showing the coupling between the plug and the stem.

The lowermost portion of the stem 21 is of constricted diameter to form a coupling pin 21C which, as shown in FIG. 5, has a slightly enlarged shoulder 21D. This pin is inserted in a socket hole 20C formed in plug 20, the socket having an annular groove adapted to receive shoulder 21D, whereby the pin 21C snaps into the socket and is retained therein. The arrangement is such that in order to remove the plug from the stem a much greater force is necessary than that normally required to dislodge the plug in case it sticks to the valve seat. Plug 20 is free to turn on pin 21C of the stem, the plug being moved axially toward or away from the valve seat as the stem is rotated by handle 22.

A back-up O ring 23 of "Viton-A" or other suitable resilient material is mounted on the stem between the plug and the threaded section. Fluid is prevented from leaking through the stem not only by the integral seal 20B but by the back-up ring.

Mounted on steam 21 is a stem retainer or threaded nut 24 formed of polyethylene or other suitable material, the nut being externally threaded and having a diameter such that it threadably engages the internal threading on the wall of inner section 14. After the stem has been rotated to adjust the valve opening, the unit is then turned in to retain the adjusted position of the stem.

Figure 4:
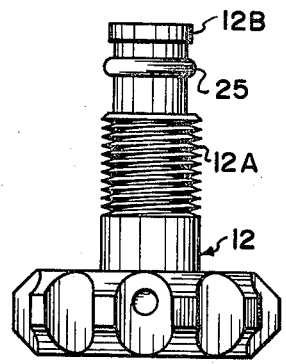
FIG. 4 is an elevational view of the removable drain plug.

The drain plug 12, as shown separately in FIG. 4, is provided with a threaded section 12A which threadably engages the internal threading on extension 19, the plug having an enlarged head 12B providing a seal. Mounted on an annular groove in the drain plug is a back-up O ring 23. The drain plug is also made of Teflon and is non-reactive with corrosive fluids.

While there has been shown a preferred embodiment of the invention, it will be appreciated that many changes may be made in the valve without departing from the essential aspect of the invention as defined in the annexed claims. It is possible, for example, to omit the drain extension and to provide an outlet pipe in lieu thereof, omitting the other outlet pipe, in which event the valve would be a 90° angle valve or spigot type. In some instances, in the valve as shown in FIGURE 1 may be used with flow in the reverse direction, so that pipe 18 is then the inlet and pipe 17 the outlet.

What I claim is:
1. A valve structure comprising:
 (A) a valve body formed of glass and constituted by:
  (a) a cylindrical outer section,
  (b) a re-entrant inner section coaxially disposed within the outer section to define therebetween a fluid chamber, the lower end of said inner section being formed into a valve seat surrounding an orifice to admit fluid from said inner section into said fluid chamber,
  (c) an inlet pipe projecting laterally from said outer section and communicating with said inner section to admit incoming fluid therein, and
  (d) an outlet pipe projecting laterally from said outer section at a position diametrically opposed to said inlet pipe and communicating with said fluid chamber, and
 (B) movable asembly constituted by:
  (a) a plug axially movable in said inner section and having an end portion whose shape conforms to said valve seat and an enlarged portion adjacent the other end thereof whose diameter is slightly greater than the inner diameter of said inner section to form a sealing ring, and
  (b) a stem extending through said inner section, one end being coupled to said plug, the other end being attached to a handle, said stem having a threaded portion to engage internal threading on said inner section whereby when said stem is rotated the plug is advanced or retracted, said stem further including a slotted portion to impart a spring-like characteristic thereto to prevent the application of a hard force to said plug.

2. A valve structure as set forth in claim 1, wherein said plug is formed of tetrafluoroethylene.

3. A valve structure as set forth in claim 1, further including a retaining nut on said stem and having external threading to engage the internal threading on said inner section.

4. A valve structure as set forth in claim 1, further including a tubular extension on said outer section, and a drain plug threadably received in said extension.

5. A valve structure as set forth in claim 1, further including an O ring on said stem interspaced between said plug and said slotted section.

6. A valve structure as set forth in claim 1, wherein said body is formed of borosilicate glass.

References Cited

UNITED STATES PATENTS

| | | | |
|---|---|---|---|
| 2,276,929 | 3/1942 | Church | 137—246.22 X |
| 3,194,533 | 7/1965 | McLay | 251—368 X |
| 3,305,211 | 2/1967 | Phillips | 251—368 X |
| 3,325,143 | 6/1967 | Phillips | 251—368 X |

WILLIAM F. O'DEA, Primary Examiner

D. R. MATTHEWS, Assistant Examiner

U.S. Cl. X.R.

23—292; 137—375, 596; 251—309, 366, 368